(12) United States Patent
Nagauker et al.

(10) Patent No.: US 11,790,520 B2
(45) Date of Patent: Oct. 17, 2023

(54) IMAGER ANALYTICS TESTING SYSTEMS AND METHODS

(71) Applicant: FLIR Systems AB, Täby (SE)

(72) Inventors: Ariel Nagauker, Rosh Ha'Ayin (IL); Chen Yahudayin, Rosh Ha'Ayin (IL)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 17/834,508

(22) Filed: Jun. 7, 2022

(65) Prior Publication Data

US 2022/0392054 A1 Dec. 8, 2022

Related U.S. Application Data

(60) Provisional application No. 63/197,988, filed on Jun. 7, 2021.

(51) Int. Cl.
| | |
|---|---|
| *G06T 7/00* | (2017.01) |
| *H04N 5/33* | (2023.01) |
| *G06T 17/00* | (2006.01) |
| *G01J 5/10* | (2006.01) |
| *G01J 5/00* | (2022.01) |

(52) U.S. Cl.
CPC .............. *G06T 7/0006* (2013.01); *G01J 5/10* (2013.01); *G06T 17/00* (2013.01); *H04N 5/33* (2013.01); *G01J 2005/0077* (2013.01); *G01J 2005/106* (2013.01); *G06T 2207/10048* (2013.01); *G06T 2207/20081* (2013.01); *G06T 2207/20084* (2013.01); *G06T 2207/20092* (2013.01); *G06T 2207/30116* (2013.01)

(58) Field of Classification Search
CPC ............................... G06V 20/64; G06V 10/82
See application file for complete search history.

(56) References Cited

U.S. PATENT DOCUMENTS

| | | | |
|---|---|---|---|
| 6,968,073 B1* | 11/2005 | O'Boyle ................ | G06V 40/10 356/3 |
| 2010/0098321 A1* | 4/2010 | Furukawa ............. | G01J 5/0003 382/218 |
| 2015/0170416 A1* | 6/2015 | McGregor .............. | G06T 19/20 345/420 |
| 2015/0358557 A1* | 12/2015 | Terre ...................... | H04N 23/61 348/164 |
| 2018/0188163 A1* | 7/2018 | Kester ........................ | G01J 3/36 |
| 2021/0100992 A1* | 4/2021 | Stanley ................ | G06V 40/171 |
| 2021/0150267 A1 | 5/2021 | Boulanger | |
| 2021/0304393 A1* | 9/2021 | Ota ........................... | G06F 3/14 |

FOREIGN PATENT DOCUMENTS

WO WO-2019246001 A1 * 12/2019 ............. G06F 16/51

* cited by examiner

*Primary Examiner* — Priyank J Shah
(74) *Attorney, Agent, or Firm* — Haynes and Boone, LLP

(57) ABSTRACT

Techniques for facilitating testing analytics of imaging systems and methods using molds are provided. In one example, a system includes a mold temperature controller configured to apply a thermal signature to a mold of a target. The system further includes a focal plane array configured to capture an infrared image of the mold. The system further includes an image analytics device configured to determine thermal analytics associated with the mold based on the infrared image. Related devices and methods are also provided.

20 Claims, 8 Drawing Sheets

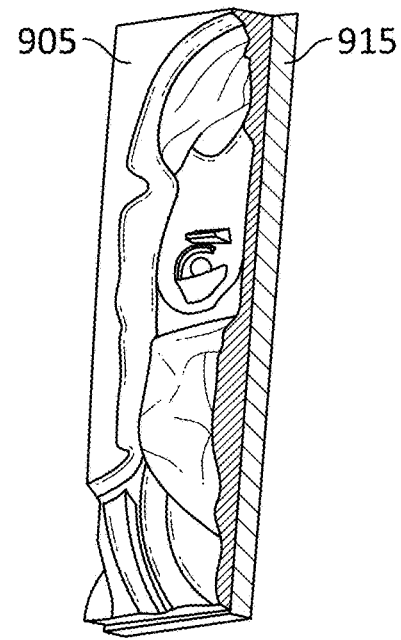
FIG. 8　　　　　　　　　FIG. 9A
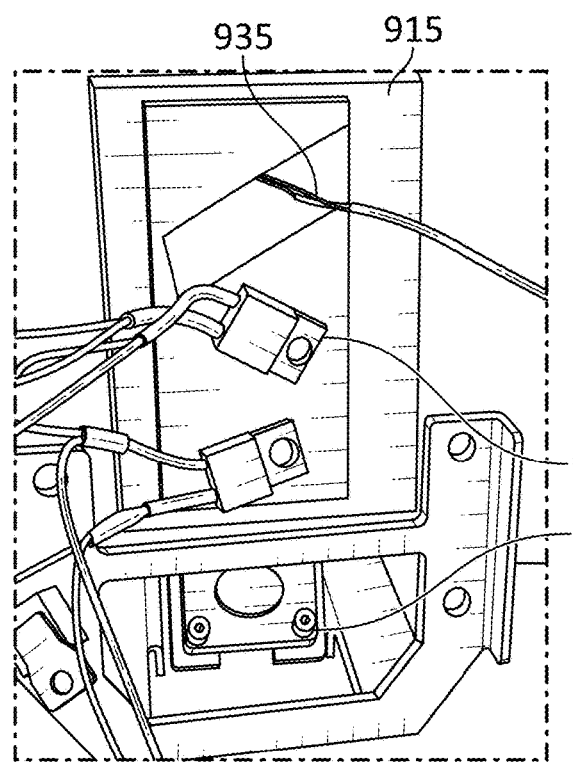
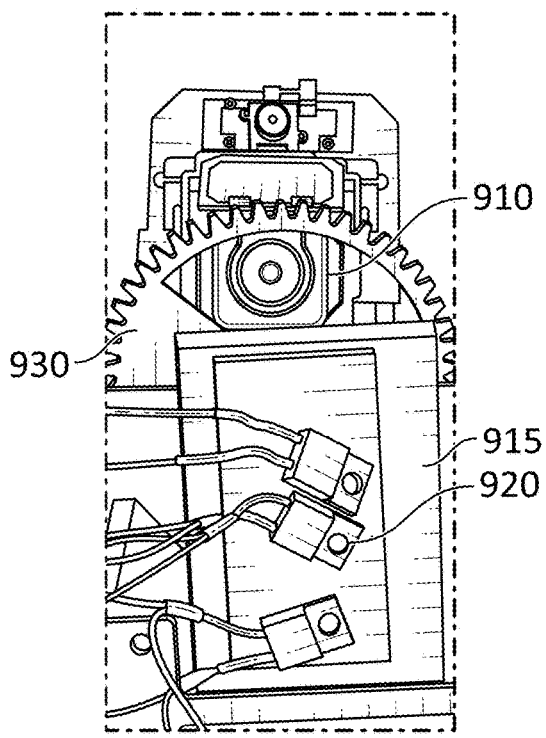
FIG. 9B　　　　　　　　FIG. 9C

IMAGER ANALYTICS TESTING SYSTEMS AND METHODS

CROSS REFERENCE TO RELATED APPLICATIONS

This application claims priority to and the benefit of U.S. Provisional Patent Application No. 63/197,988 filed Jun. 7, 2021 and entitled "IMAGER ANALYTICS TESTING SYSTEMS AND METHODS," which is hereby incorporated by reference in its entirety.

TECHNICAL FIELD

One or more embodiments relate generally to infrared imaging and more particularly, for example, to techniques for testing analytics of imaging systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a system includes a mold temperature controller configured to apply a thermal signature to a mold of a target. The system further includes a focal plane array configured to capture an infrared image of the mold. The system further includes an image analytics device configured to determine thermal analytics associated with the mold based on the infrared image In one or more embodiments, a method includes applying a thermal signature to a mold of a target. The method further includes capturing an infrared image of the mold. The method further includes determining thermal analytics associated with the mold based on the infrared image.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 illustrates a thermal image snapshot of a person's face for use in creating a mold in accordance with one or more embodiments of the present disclosure.

FIGS. 9A, 9B, and 9C illustrate views associated with a setup to facilitate testing of analytics of an imaging system using a mold in accordance with one or more embodiments of the present disclosure.

Figure 1:
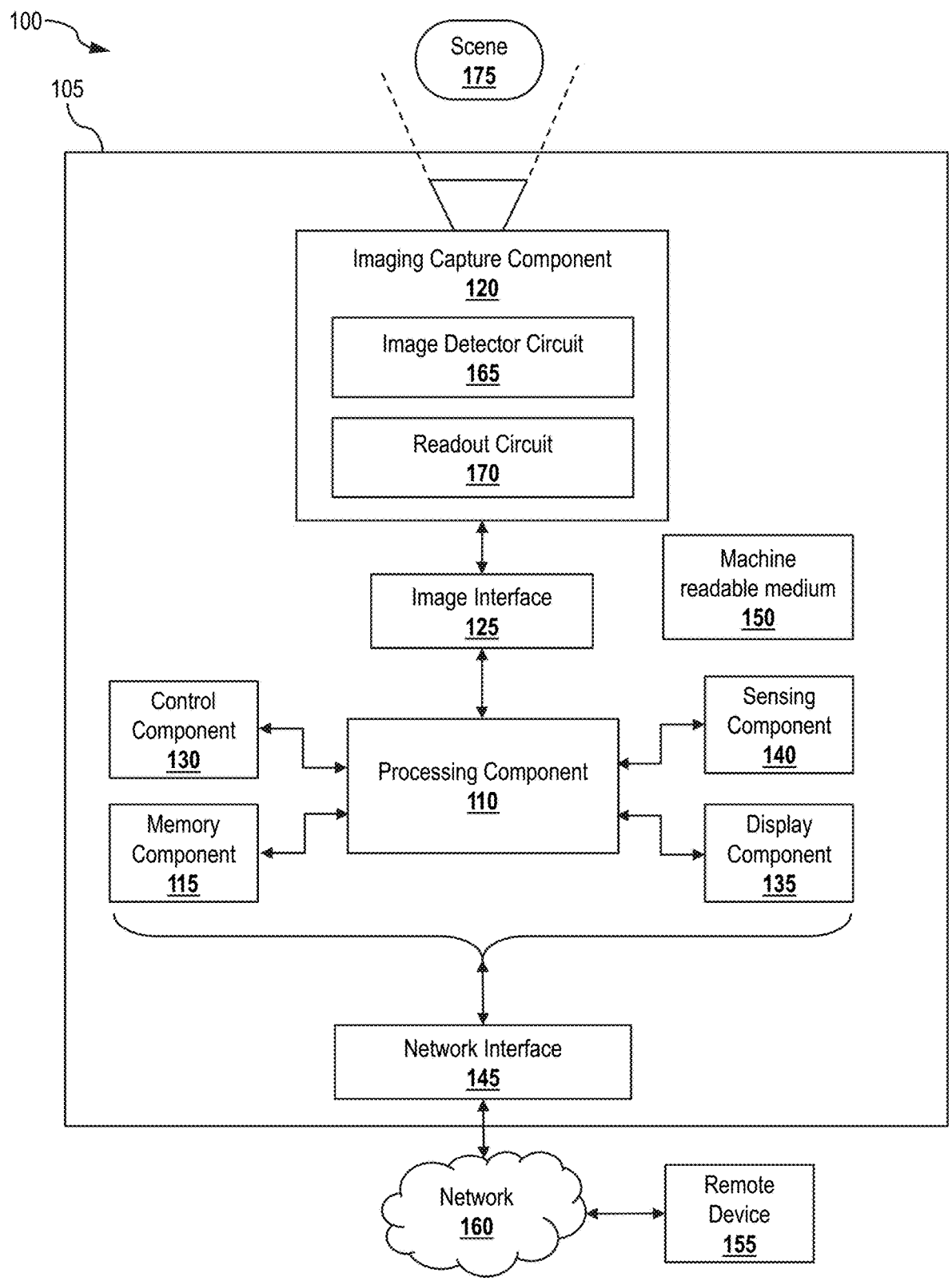
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating testing of imaging system analytics using images of molds of targets of interest. A target of interest is generally application dependent and may include, by way of non-limiting examples, a human body, a human face, a car, an airplane, a bicycle, a circuit board, a fuse box, a toy, and so forth. In some cases, a mold of a target of interest may be the same size or of similar size as the target. For example, a mold of a human face may be around the same size as the size (e.g., average size) of an actual human face. In other cases, a mold of a target of interest may be different from the size of the target (e.g., to facilitate testing of imaging system analytics). As one example, a mold of an airplane may have a size of a much smaller scale than a size of an actual airplane. As another example, a mold of a small insect may have a size of a much larger scale than a size of an actual insect.

A mold may be and/or may generally refer to any physical representation of a target and, as such, may be imaged instead of the target (e.g., for testing and verification of an imaging system). A design of a mold may be determined using modeling data associated with the target. The design of the mold may identify a size, a shape, a material, a texture, and/or other characteristic of the mold. The modeling data may include two-dimensional (2D) models/representations associated with the target, three-dimensional (3D) models/representations associated with the target (e.g., three-dimensional image(s), sculpture), and/or other data that identify physical characteristics associated with the target. For example, the modeling data may include an image or multiple images of one or more targets of the same target type (e.g., target type may be humans in general and targets may be specific humans) captured from different angles/views.

In some embodiments, infrared images (e.g., thermal infrared images) of molds may be captured for testing analytics of imaging systems (e.g., infrared imaging systems). An infrared image of a mold may provide a heat map of the mold. In some cases, a pixel data value of a pixel of an infrared image may correspond to a temperature associated with the pixel. A thermal signature (e.g., also referred to as a heat signature) may be applied to the mold to allow the mold to simulate/emulate thermal characteristics of the target. In this regard, applying of a thermal signature on the mold may allow infrared radiation (e.g., heat) generated from a surface(s) of the mold to be propagated to simulate a real-life heat distribution/transfer associated with the target corresponding to the mold. The thermal signature may be defined by parameters that indicate a location(s) of a heating element(s), a temperature setting(s) of the heating element(s), and/or other characteristics to effectuate desired thermal properties. Thermal signatures may be determined based on infrared radiation models of the target. The infrared radiation models may provide real-world data and/or simulation data usable to derive into relationships between an applied heat signature on a target and thermal properties exhibited by the target.

The mold may be disposed in a naturally occurring environment or a staged environment. In some cases, appropriate equipment may be used to create an environment (e.g., 2D environment, 3D environment) that simulates/emulates (e.g., approximate) real world settings. Such equipment may be used to control/simulate, by way of non-limiting examples, ambient temperature, weather conditions (e.g., humidity using a humidity machine(s), rain using a sprinkler(s), fog using a fog machine(s), windiness using a fan(s)), and/or other properties of a desired environment. In some cases, ambient light and/or time of day (e.g., defined by the ambient temperature and the ambient light) may be simulated/emulated. It is noted that, while ambient light and time of day generally do not affect infrared imaging of the target (and thus may be ignored when defining the environment for infrared imaging purposes), the ambient light and time of day may be controlled for and affect certain applications, such as applications in which fusing of infrared images with, for example, visible-light images may be desired.

Target classifications that may be provided as output by target detection processes are generally dependent on application. In general, the target detection processes may be trained to distinguish between a set of pre-established target types. For any target (e.g., object, person, etc.) in a scene or an image that is determined by the target detection processes to not fall within the pre-established target types, the processes may ignore such features or indicate that such features are unidentifiable by the processes. In some cases, a user may train the target detection processes to expand and/or refine the set of pre-established target types.

Performing video and/or image analytics associated with a target under different conditions (e.g., different environments, different target temperature) generally involves high costs (e.g., time costs, equipment costs, setup costs, etc.) and diverse images (e.g., from different views in different environments) to achieve an acceptable level of accuracy. In some aspects, such images may be used as part of training datasets to train a neural network (e.g., a convolutional neural network (CNN)) to classify one or more targets (e.g., persons, cars, animals, and/or other features, or portions thereof) in the images. In some cases, performing video and/or image analytics using a CNN generally includes thousands of images to achieve an acceptable level of accuracy for many use environments.

Using various embodiments, images of molds may be used for performing video and/or image analytics. In some aspects, such images of molds may be used to test and verify one or more imaging systems (e.g., infrared imaging systems). In some aspects, such images of molds may be used exclusively to test and verify one or more imaging systems, whereas images (e.g., real-world images) of actual targets are used to train neural networks (e.g., CNNs). In some aspects, such images of molds may be used (e.g., as part of a training dataset) to train neural networks. Images of molds may be used alternatively or in addition to images of actual targets. In some cases, using images of molds may reduce a number of images of actual targets needed or eliminate use of images of actual targets. In this regard, capturing of naturally occurring or staged imagery using actual targets can be very expensive, impractical, and/or even dangerous (e.g., a risky location to place a camera), generally requiring travel, searching for various settings and scenarios, weather conditions, and/or other desired elements. As an example, when the target is a person's face, time spent being imaged by one or more imaging systems may inconvenience or even be impossible for the person. As such, testing and verification of imaging analytics using molds may allow for saving time and costs. Furthermore, different imaging systems may be able to capture images of the same or similar molds (e.g., the same or similar actual molds or molds manufactured using the same or similar design), thus facilitating comparing and testing performance variations between different imaging system analytics (e.g., different thermal camera analytics).

Although various embodiments for testing imaging system analytics are described primarily with respect to infrared imaging, methods and systems disclosed herein may be utilized in conjunction with devices and systems such as imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum. For example, images of a scene including one or more molds may be infrared images that can be fused/blended with visible-light images of the scene.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging device 105 includes, according to one implementation, a processing component 110, a memory component 115, an image capture component 120, an image interface 125, a control component 130, a display component 135, a sensing component 140, and/or a network interface 145. The processing component 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 110 may be configured to interface and communicate with the various other components (e.g., 115, 120, 125, 130, 135, 140, 145, etc.) of the imaging system 100 to perform such operations. For example, the processing component 110 may be configured to process captured image data received from the imaging capture component 120, store the image data in the memory component 115, and/or retrieve stored image data from the memory component 115. In one aspect, the processing component 110 may be configured to perform various system control operations (e.g., to control communications and operations of various components of the imaging system 100) and other image processing operations (e.g., video/image analytics, data conversion, data transformation, data compression, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 110 may be configured to execute software instructions stored in the memory component 115 so as to perform method and process steps and/or operations. The processing component 110 and/or the image interface 125 may be configured to store in the memory component 115 images or digital image data captured by the image capture component 120.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the processing component 110, with code (e.g., software or configuration data) for the modules stored, for example, in the memory component 115.

The imaging device 105 may be a video and/or still camera to capture and process images and/or videos of a scene 175. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be a visible-light image. In another example, the detector output image may be an infrared image (e.g., thermal infrared image). For a thermal infrared image (e.g., also referred to as a thermal image), each pixel value of the thermal infrared image may represent a temperature of a corresponding portion of the scene 175.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 110 that processes the detected image data as read out by the readout circuit 170, with communication of data from the readout circuit 170 to the processing component 110 facilitated by the image interface 125. An image capturing frame rate may refer to the rate (e.g., detector output images per second) at which images are detected/output in a sequence by the image detector circuit 165 and provided to the processing component 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the processing component 110. In this regard, the received images or image data may be converted into signals or data suitable for processing by the processing component 110. For example, in one embodiment, the image interface 125 may be configured to receive analog video data and convert it into suitable digital data to be provided to the processing component 110.

The image interface 125 may include various standard video ports, which may be connected to a video player, a video camera, or other devices capable of generating standard video signals, and may convert the received video signals into digital video/image data suitable for processing by the processing component 110. In some embodiments, the image interface 125 may also be configured to interface with and receive images (e.g., image data) from the image capture component 120. In other embodiments, the image capture component 120 may interface directly with the processing component 110.

The control component 130 includes, in one embodiment, a user input and/or an interface device, such as a rotatable knob (e.g., potentiometer), push buttons, slide bar, keyboard, and/or other devices, that is adapted to generate a user input control signal. The processing component 110 may be configured to sense control input signals from a user via the control component 130 and respond to any sensed control input signals received therefrom. The processing component 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons of the control unit may be used to control various functions of the imaging device 105, such as autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The processing component 110 may be configured to display image data and information on the display component 135. The processing component 110 may be configured to retrieve image data and information from the memory component 115 and display any retrieved image data and information on the display component 135. The display component 135 may include display circuitry, which may be utilized by the processing component 110 to display image data and information. The display component 135 may be adapted to receive image data and information directly from the image capture component 120, processing component 110, and/or image interface 125, or the image data and information may be transferred from the memory component 115 via the processing component 110. In some aspects, the control component 130 may be implemented as part of the display component 135. For example, a touch-screen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the processing component 110. In one aspect, the processing component 110 may be configured to communicate with the sensing component 140. In various implementations, the sensing component 140 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the processing component 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.).

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the processing component 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the processing component 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 110 may be combined with the memory component 115, image capture component 120, image interface 125, display component 135, sensing component 140, and/or network interface 145. In another example, the processing component 110 may be combined with the image capture component 120, such that certain functions of processing component 110 are performed by circuitry (e.g., a processor, a microprocessor, a logic device, a microcontroller, etc.) within the image capture component 120.

In an embodiment, the remote device 155 may be referred to as a host device. The host device may communicate with the image device 105 via the network interface 145 and the network 160. For example, the imaging device 105 may be a camera that can communicate with the remote device 155. The network interface 145 and the network 160 may collectively provide appropriate interfaces, ports, connectors, switches, antennas, circuitry, and/or generally any other components of the imaging device 105 and the remote device 155 to facilitate communication between the imaging device 105 and the remote device 155. Communication interfaces may include an Ethernet interface (e.g., Ethernet GigE interface, Ethernet GigE Vision interface), a universal serial bus (USB) interface, other wired interface, a cellular interface, a Wi-Fi interface, other wireless interface, or generally any interface to allow communication of data between the imaging device 105 and the remote device 155.

Figure 2:
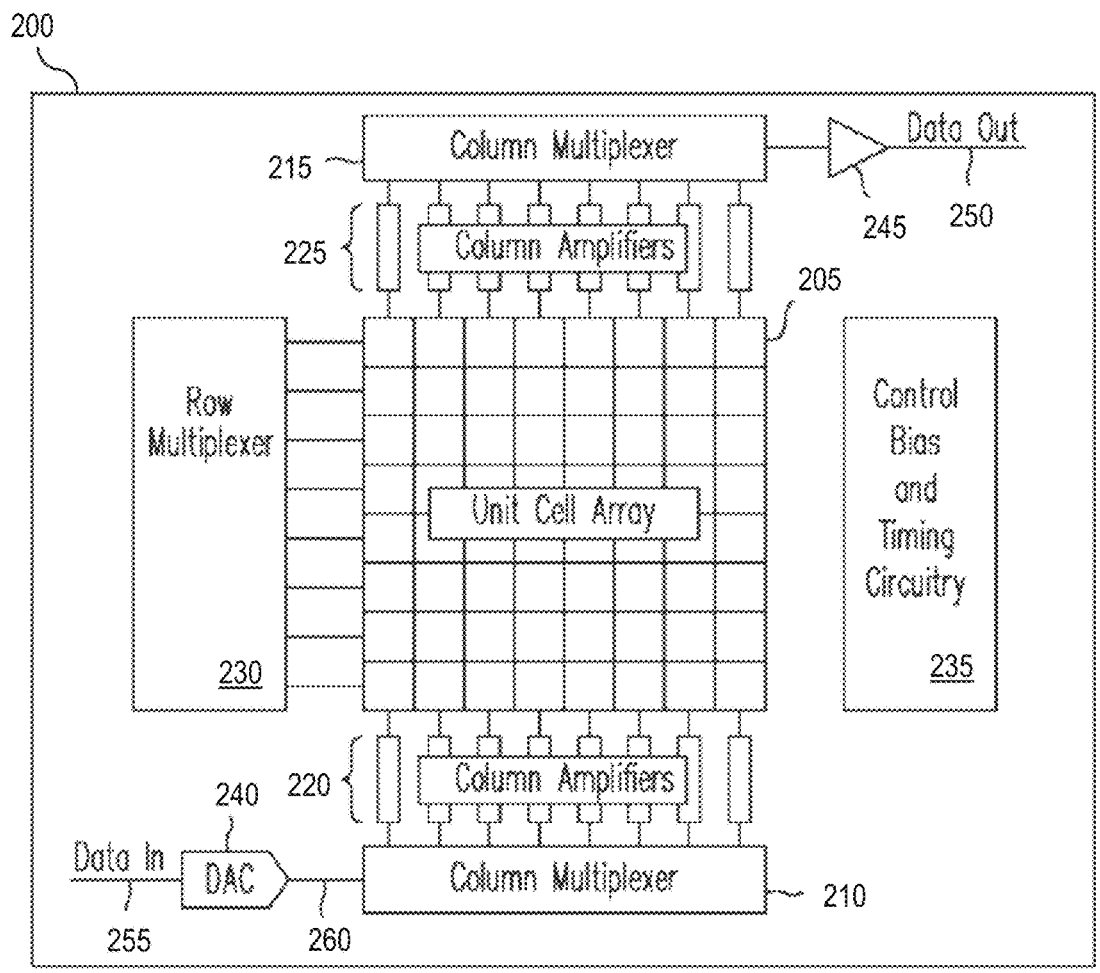
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light, visible-light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 110 and/or image capture component 120 of FIG. 1.

In an embodiment, the image sensor assembly 200 may be implemented as part of an imaging device (e.g., 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., FFC or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
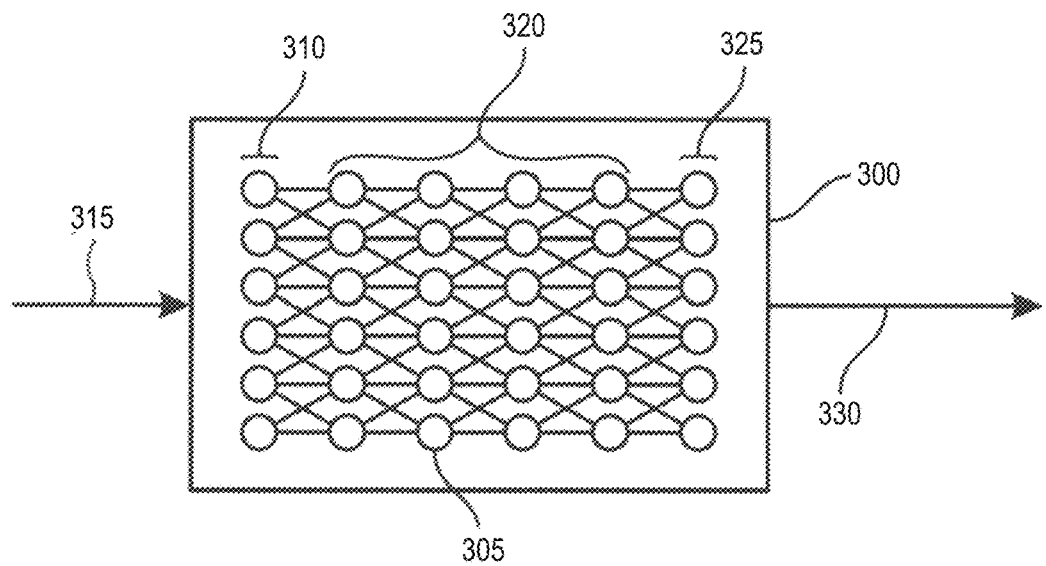
FIG. 3 illustrates a block diagram of a neural network in accordance with one or more embodiments of the present disclosure.

FIG. 3 illustrates a block diagram of a neural network 300 (e.g., an artificial neural network) in accordance with one or more embodiments of the present disclosure. The neural network 300 may be used to process images to detect targets (e.g., objects, persons, and/or portions thereof). In some cases, such as when the target is a person, the neural network 300 may be used to identification specific locations of the person (e.g., an inner canthus of the person) and determine additional characteristics such as a health of the person (e.g., based on a temperature of the person at one or more locations). In an aspect, the neural network 300 may be a CNN. In an embodiment, the neural network 300 may be implemented by the processing component 110.

As shown, the neural network 300 includes various nodes 305 (e.g., neurons) arranged in multiple layers including an input layer 310 receiving one or more inputs 315, hidden layers 320, and an output layer 325 providing one or more outputs 330. Although particular numbers of nodes 305 and layers 310, 320, and 325 are shown, any desired number of such features may be provided in various embodiments.

In some embodiments, the neural network 300 operates as a multi-layer classification tree using a set of non-linear transformations between the various layers 310, 320, and/or 325 to extract features and information from images (e.g., thermal images) by an imager (e.g., the imaging device 105). For example, the neural network 300 may be trained on large amounts of data (e.g., thermal or visible images of human faces) such that the neural network 300 learns to distinguish human characteristics. This iterative procedure is repeated until the neural network 300 has trained on enough data such that the neural network 300 can perform predictions of its own.

The neural network 300 may be used to perform target detection (e.g., detection for pre-established targets) and additional characteristic detection on various images (e.g., thermal images) captured by the imaging system 100 and provided to the input(s) 315 of the neural network 300. The results of such detection may be provided by the neural network 300 at the output(s) 330. The neural network 300 may be trained by providing infrared images (e.g., thermal infrared images and/or non-thermal infrared images) and/or visible-light images of known targets (e.g., cars, planes, circuit boards, fuse boxes, human bodies, human faces) with known characteristics (e.g., images and related information regarding the characteristics may be stored in a database associated with training neural networks) to the inputs 315.

In some embodiments, alternatively or in addition to images of known targets with known characteristics, the neural network 300 may be trained by providing infrared images and/or visible-light images of molds (e.g., mold of a human face) of such targets. In some aspects, such images of molds may be provided as part of stored training datasets used to train the neural network 300. The molds with appropriate thermal signatures applied may simulate actual targets. Applying of a thermal signature on a mold may allow infrared radiation (e.g., heat) generated from a surface(s) of the mold to be propagated to simulate a real-life heat distribution/transfer associated with the target corresponding to the mold. For a given target, using images of the mold of the target may facilitate testing of an imaging system analytics and reduce costs (e.g., time, inconveniences) associated with capturing images of the corresponding target. It is noted that, although the neural network 300 is described primarily in relation to detecting human targets, the neural network 300 may generally be trained to detect any desired target and/or any characteristic(s) of the target dependent on application. By way of non-limiting examples, target types may include a human body, a car, an airplane, a bicycle, an electrical circuit, a fuse box, a human face (e.g., or a portion of the face such as the inner canthus as described above), and/or others. In other embodiments, such images of molds may be used exclusively to test and verify one or more imaging systems, whereas images (e.g., real-world images) of actual targets are used to train neural networks (e.g., CNNs).

Figure 4:
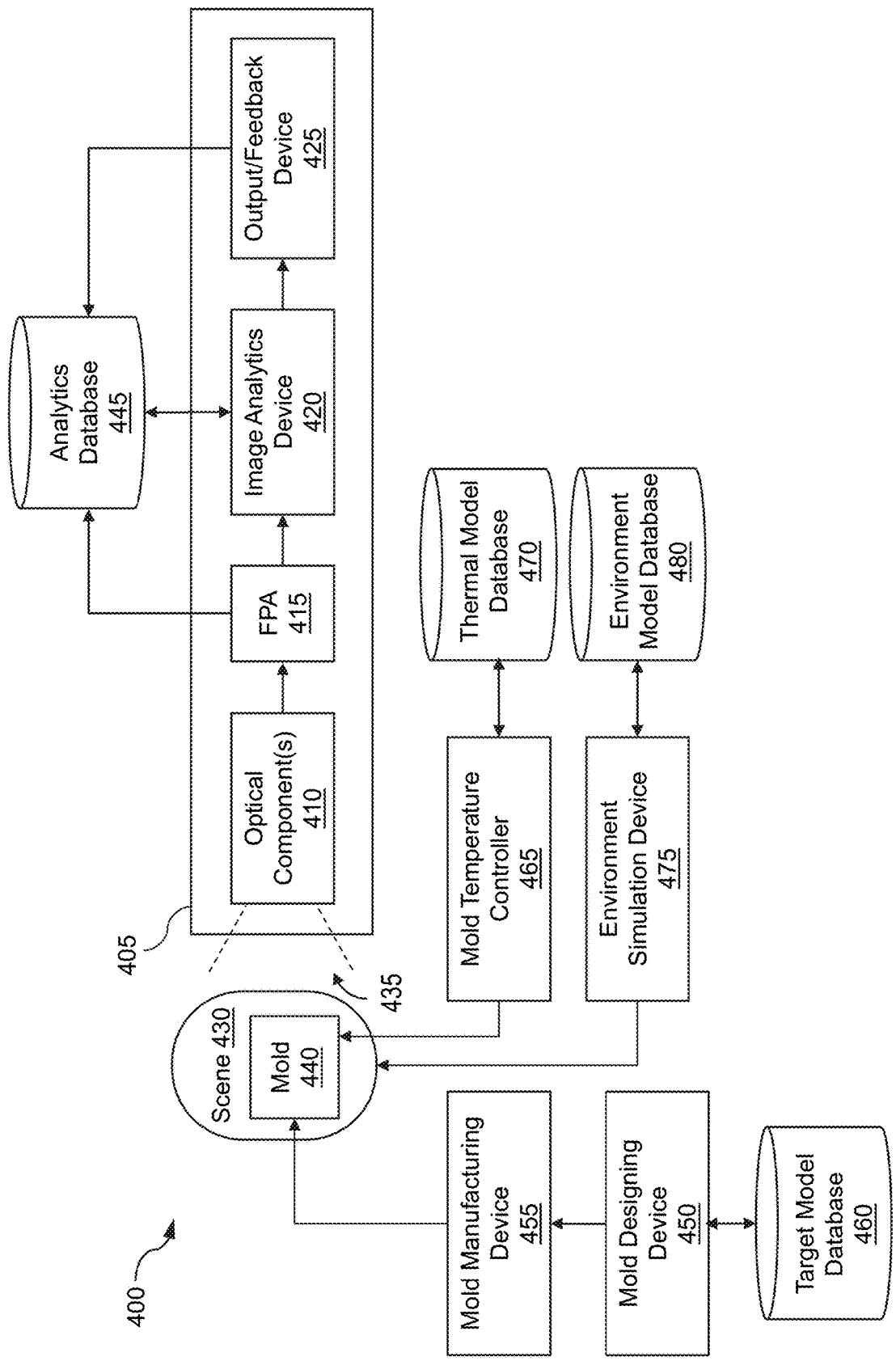
FIG. 4 illustrates an example system facilitating imaging system testing using molds in accordance with one or more embodiments of the present disclosure.

FIG. 4 illustrates an example system 400 facilitating imaging system testing using molds in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 includes an imaging system 405. The imaging system 405 includes one or more optical components 410, an FPA 415, an image analytics device 420, and an output and/or feedback device 425 (e.g., referred to hereafter as an output/feedback device). The optical component(s) 410, the FPA 415, the image analytics device 420, and/or the output/feedback device 425 may be implemented using one or more processing circuits on a single chip or distributed across two or more chips. The imaging system 405 may be, may include, or may be a part of, an infrared imaging system used to capture and process images. In an embodiment, the infrared imaging system may be, may include, or may be a part of, the imaging system 100 of FIG. 1.

The optical component(s) 410 may receive electromagnetic radiation from a scene 430 through an aperture 435 of the system 400 and pass the electromagnetic radiation to the FPA 415. In FIG. 4, the scene 430 includes a mold 440 of a target (e.g., an object, a person, and/or a portion thereof) for facilitating testing of analytics associated with the imaging system 405. For example, the optical component(s) 410 may direct and/or focus the electromagnetic radiation on the FPA 415. The optical component(s) 410 may include one or more windows, lenses, mirrors, beamsplitters, beam couplers, and/or other components. The optical component(s) 410 may include components each formed of material and appropriately arranged according to desired transmission characteristics, such as desired transmission wavelengths and/or ray transfer matrix characteristics.

The FPA 415 includes a detector array and an ROIC. The FPA 415 may receive the electromagnetic radiation from the optical component(s) 410 and generate image data based on the electromagnetic radiation. The image data may include infrared data values (e.g., thermal infrared data values). As an example, the FPA 415 may include or may be coupled to an ADC circuit that generates infrared data values based on infrared radiation. A 16-bit ADC circuit may generate infrared data values that range from 0 to 65,535. The infrared data values may provide temperatures for different portions of the scene 430, such as provide temperatures of objects, persons, other features/aspects in the scene 430, and/or portions thereof (e.g., a temperature of a human face). In some cases, the infrared image data may be represented in an image according to a palette, such that a visual representation value (e.g., color value or grayscale value) of each pixel of the image is indicative of a temperature associated with that pixel. For example, temperatures associated with different portions of the mold 440 may be represented in pixels (e.g., a subset of pixels) of an infrared image (e.g., a thermal infrared image) that correspond to the mold 440. The infrared image data may be displayed (e.g., to a user), stored, and/or processed. In an aspect, the detector array is an infrared detector array (e.g., microbolometer array) that detects IR radiation (e.g., thermal IR radiation). In an embodiment, the FPA 415 may be implemented by the imaging capture component 120.

The image analytics device 420 may receive the image data (e.g., the infrared data values) generated by the FPA 415 and process/analyze the image data (e.g., images formed by infrared data values) to obtain analytics. In an embodiment, the image analytics device 420 may be implemented by the processing component 110 of the imaging device 105 (e.g., a camera) and/or a processing component of the remote device 155 (e.g., a host device). In this regard, in some cases, the processing may be distributed across the imaging device 105 and the remote device 155).

The image analytics device 420 may analyze images (e.g., formed of the image data) and classify automatically (e.g., using a trained neural network) and/or manually (e.g., using user input received via a user interface) one or more targets (e.g., objects, persons, and/or other features being detected for) in the images. As such, the analytics may indicate targets detected in the scene 430. In this regard, the image analytics device 420 may be trained to detect for one or more target types (e.g., a human or portion thereof such as a human face, a car, a plane, a circuit board) by performing target detection/recognition on the image data based upon, for example, shapes, sizes, thermal characteristics, and/or other characteristics identified in the scene 430 by the image analytics device 420. For example, to facilitate human detection, a shape, a size, and thermal characteristics may be used together to avoid classifying non-human objects in a scene that has a temperature at a healthy human's typical body temperature (e.g., 37° C.) as humans.

In some aspects, the image analytics device 420 may associate a condition with a target detected in the images. Associating a condition with a target may be referred to as determining (e.g., guessing) a condition of the target. In this regard, the image analytics device 420 may be appropriately trained to determine a presence of a condition. As an example, the image analytics device 420 may perform target detection to identify a particular electrical circuit (e.g., a circuit the image analytics device 420 is trained to analyze) in an image and conditions associated with the electrical circuit. For the electrical circuit, the image analytics device 420 may, based on thermal characteristics of the electrical circuit, determine whether the electrical circuit is in a sleep mode, is in normal operation, is heavily utilized, is overheating, is sparking, and/or is encountering other situations.

As another example, the image analytics device 420 may perform target detection to identify a car. A car may be associated with various thermal models that simulate a normally operating car, an overheating car, and/or other cars associated with other operating characteristics. For a given mold of a car, one or more heat signatures may be applied to the mold of the car to simulate a normally operating car, a car overheating due to a cooling system leak, a car overheating due to a faulty radiator fan, and/or other situations. Dependent on application, the mold may be made to coarsely model/simulate a general economy car or specifically model/simulate an economy car of a particular make and model.

As another example, the image analytics device 420 may perform target detection to identify any human faces in an image and determine health conditions associated with the human faces. For each target determined by the image analytics device 420 to be a human face, the image analytics device 420 may associate a health condition to the human based on thermal characteristics of the human face. For example, the image analytics device 420 may determine the health condition based on a temperature(s) associated with pixels corresponding to the inner canthus of the human face, where the inner canthus may be considered to provide a general approximation of body temperature, such that, for example, elevated temperatures of the inner canthus may be associated with elevated body temperatures generally. In one case, the image analytics device 420 may be able to (e.g., trained to) simply determine whether a human is healthy, with any condition deviating from healthy being identified as unhealthy. In another case, the image analytics device 420 may be able to determine whether a human is healthy or unhealthy, as well as identify a possible reason the human is unhealthy (e.g., based on temperatures at different parts of the human).

In some aspects, the image analytics device 420 may generate an indication (e.g., also referred to as a notification or alert) associated with the analytics. The indication may be a visual indication, an audio indication, a tactile indication, and/or other type of indication. In some cases, the image analytics device 420 may annotate the images. As one example, the image analytics device 420 may provide an image (e.g., an annotated image) with a bounding box around each detected target and/or data (e.g., numbers indicating temperature measurement, a check mark indicating the target is determined to be healthy). As another example, the image analytics device 420 may provide an image (e.g., an annotated image) with an error message indicating an error has occurred in gathering analytics and, in some cases, identifying the error to facilitate corrective action associated with imaging the target. As examples, an error message may indicate that the target is too close to or otherwise not within a desired distance from the FPA 415, the target is wearing apparel that should be removed (e.g., headware, glasses, facemasks, etc.), and so forth.

Alternatively or in addition to such visual indications (e.g., the annotated images), an audio indication and/or a tactile indication may be provided. As an example, an audio indication may include a first notification sound or no sound when a target is determined to be healthy (e.g., the target is a human) or operating properly (e.g., the target is a car) or a second notification sound when the target is determined to not be healthy or not to be operating properly. As an example, a tactile indication may be a 3D print out (e.g., 3D Braille print out) to provide the same or similar data as provided in the examples above by the visual indication and audio indication. In this regard, indications may be in the form of text, icons, colors, flashing lights, sounds, alarms, and/or other indication types to be provided using the various components as appropriate.

In an embodiment, the image analytics device 420 may perform target detection based on appropriately trained neural networks (e.g., CNNs). In some cases, such trained neural networks may also determine a condition(s) associated with a detected target(s). As an example, the image analytics device 420 may implement the neural network 300 and/or other neural networks. In some cases, the image analytics device 420 may associate each target detection by the image analytics device 420 with a confidence level (e.g., indicative of a probability that the image analytics device 420 correctly identifies/classifies a feature in an image as being a certain target type) and each condition determination/association for the target by the image analytics device 420 with a confidence level (e.g., indicative of a probability that the image analytics device 420 correctly determines/associates a condition (e.g., healthy human or febrile human)).

The output/feedback device 425 may provide the indication associated with the analytics. In this regard, the indication may provide the analytics to a user of the imaging system 405 and/or others. In an embodiment, the output/feedback device 425 may be implemented by the processing component 110, the control component 130, and/or the display component 135 of the imaging device 105 (e.g., a camera) and/or a processing component, a control component, and/or a display component of the remote device 155 (e.g., a host device). In this regard, in some cases, the providing of the indication may be distributed across the imaging device 105 and the remote device 155).

As non-limiting examples, the output/feedback device 425 may include a display device (e.g., monitor) to display visual indications (e.g., annotated images), an audio device (e.g., speakers) to emit audio indications, a printer device to provide tactile indications, and so forth. In some cases, the output/feedback device 425 may provide appropriate user interfaces to receive user input as feedback. The feedback may include feedback associated with the indications. As an example, a user of the imaging system 405 may confirm and/or edit annotations in the annotated images and/or add new annotations. Such confirmations, edits, and/or additions may be considered feedback. Alternatively or in addition, the feedback may include feedback related to other aspects associated with testing of imaging system analytics. As an example, the feedback may relate to confirming and/or editing models used to generate the mold 440, models used to simulate/emulate a certain thermal signature for the mold 440, and/or models used to simulate/emulate a certain environment for the scene 430. As such, the feedback may be used to further train the image analytics device 420 and/or adapt a scene, a mold, and/or other feature to facilitate testing of imaging system analytics.

Data associated with the testing of imaging system analytics may be stored (e.g., in memories, databases, etc.). Such storage may be local to the devices and/or systems and/or remote from the devices and/or systems, such as a remote server(s)/database(s) accessible via a local area network and/or a cloud service. In FIG. 4, the system 400 includes an analytics database 445 for storing images of molds captured by the FPA 415, analytics (e.g. in the form of annotated images and/or other indications) generated by the image analytics device 420, and/or feedback (e.g., user feedback) received by the output/feedback device 425. In some cases, data stored in the analytics database 445 may be used to train a neural network implemented by the imaging system 405 (e.g., the image analytics device 420 of the imaging system 405) and/or other imaging systems.

To form molds, such as the mold 440, the system 400 includes a mold designing device 450 and a mold manufacturing device 455. The mold designing device 450 may be used to design molds. In an embodiment, the mold designing device 450 may be implemented as part of the imaging device 105, the remote device 155, and/or other device.

For a given target or target type, a design of a mold of the target may be based on a target itself (e.g., the actual human face) and/or modeling data associated with the target or target type. In an aspect, a target type may refer to a category of targets (e.g., a human category) whereas a target of the target type may refer to a specific target (e.g., a specific human that falls). The design of the mold may identify a size, a shape, a material, a texture, and/or other characteristic of the mold. A mold of a target may have a size of a larger scale or a smaller scale than a size (e.g., an average size) of the target. As one example, a mold of an airplane may have a size of a much smaller scale than a size of an actual airplane. As another example, a mold of a small insect may have a size of a much larger scale than a size of an actual insect.

In some cases, one or more molds may be defined for a given target type. As an example, for some applications, a single mold may be used to represent a car and analytics determined for the mold may be used to generally characterize all cars. In other applications, analytics determined for the single mold may apply onto to the target used to generate the mold. In some cases, different molds may be used to represent cars of different shapes and/or sizes, such that analytics determined for each mold may be used to characterize cars having the shape and/or size corresponding to the mold.

The modeling data may include two-dimensional (2D) models/representations of the target (e.g., an image or multiple images captured from different angles/views), three-dimensional (3D) models/representations of the target (e.g., three-dimensional image(s), sculpture), and/or other data that identify physical characteristics of the target. In some cases, such models/representations may include data (e.g., 2D images, 3D images) of different targets in various real-world conditions that may be publicly available in databases (e.g., online databases) for use in designing the molds. The modeling data may be adjusted/refined (e.g., based on input from a user of the system 400 and/or other users) as the molds are generated and used for testing imaging system analytics to facilitate designing of improved molds (e.g., refined size, refined shape, and/or more appropriate material). For example, if feedback from a user indicates that a mold manufactured according to certain modeling data is not producing accurate image classification results, then the modeling data may be adjusted/refined and/or new modeling data generated.

The mold designing device 450 may include one or more imaging devices (e.g., camera), one or more user interfaces, one or more memories, and/or other circuitry/devices appropriate to facilitate design of the molds. Data indicative of a design of a mold to be manufactured and associated data (e.g., 2D models/representations, 3D models/representations, etc.) may be stored (e.g., for later retrieval) in a memory of the mold designing device 450 or otherwise accessible to the mold designing device 450.

Data associated with designing a mold may be stored (e.g., in memories, databases, etc.). Such storage may be local to the devices and/or systems and/or remote from the devices and/or systems, such as a remote server(s)/database(s) accessible by the mold designing device 450 via a local area network and/or a cloud service. In FIG. 4, the system 400 includes a target model database 460 for storing designs of molds to be manufactured, modeling data (e.g., 2D models/representations, 3D models/representations, etc.), and/or other data associated with various targets. In some cases, such models and/or other data may be adjusted based on feedback (e.g., user feedback) to facilitate designing of improved molds.

The mold manufacturing device 455 may manufacture molds, such as the mold 440, based on designs corresponding to the molds. The mold manufacturing device 455 may receive a design from the mold designing device 450 and/or from memory (e.g., the target model database 460) used to store the design. By way of non-limiting examples, the mold manufacturing device 455 may include a printer device (e.g., 3D printer device), a computer numerical control (CNC) machining device, an injection molding device, an extrusion device, a polymer casting device, and/or any device appropriate to manufacture a desired mold. Molds of different target types may be associated with different mold manufacturing devices. As one example, the mold manufacturing device 455 may include a 3D printer device to print a mold of a human face. As another example, the mold manufacturing device 455 may include a CNC machining device to manufacture a mold of an airplane (e.g., the mold is a 1:1000 scale model of an actual airplane of a certain make/model).

In some cases, after a mold is manufactured by the mold manufacturing device 455, additional features may be manually (e.g., by a user of the system 400) defined in the mold from the mold manufacturing device 455 to provide the mold 440. For example, when the mold 440 is of a human face, a user may drill two holes in the mold from the mold manufacturing device 350 to obtain the mold 340. In some cases, the mold manufacturing device 350 may be able to directly manufacture the mold 340 (e.g., a mold of the human face including holes). The holes may represent (e.g., simulate, emulate) human eyes. More particularly, in some cases, each hole may represent an inner canthus (e.g., the inner corner of the eye where the upper and lower lids meet). The inner canthus provides a general approximation of body temperature, such that, for example, elevated temperatures of the inner canthus may be associated with elevated body temperatures generally.

The system 400 includes a mold temperature controller 465. The mold temperature controller 465 may be used to control a thermal signature (e.g., also referred to as a heat signature or a temperature signature) to be applied to the mold 440 and apply the thermal signature to the mold 440. In an aspect, the heat signature may be applied to the mold 440 to simulate thermal conditions associated with the target represented by the mold 440. Applying of a thermal signature on the mold 440 may allow infrared radiation (e.g., heat) generated from a surface(s) of the mold 440 in the scene 430 to be propagated to simulate a real-life heat distribution/transfer associated with the target corresponding to the mold 440.

In general, the mold temperature controller 465 may include components appropriate to facilitate application of desired heat signatures. The mold temperature controller 465 may include one or more heating elements such that the heating element(s) may be properly placed (e.g., by the user) and heat applied by the heating element(s) according to the heat signature. In some cases, the mold temperature controller 465 may also include one or more fan elements such that the fan element(s) may be properly placed and operated to blow air on the mold 440. The mold temperature controller 465 may include a controller/logic device to control operation of the heating element(s) and the fan element(s). As an example, when the target is a human face (e.g., the mold 440 simulates/emulates a human face), the mold temperature controller 465 may apply heat to simulate/emulate thermal properties (e.g., temperatures) of a face of a healthy human or a face of a febrile human. A heat signature applied to the mold 440 may cause the mold 440 to emit infrared radiation (e.g., corresponding to thermal properties) associated with a face of a healthy human or emit infrared radiation associated with a face of an unhealthy human (e.g., such as a febrile human).

The mold temperature controller 465 may determine parameters that define a thermal signature (e.g., heating element(s) location(s) and temperature(s), fan element(s) speed(s) and direction(s)) for application to the mold 440 corresponding to a target using infrared radiation models associated with the target. In some cases, the infrared radiation models may provide real-world data and/or simulation data usable to derive into relationships between an applied heat signature on a target or target type and thermal properties (e.g., temperature distribution) of the target or target type in response to the applied heat signature. The infrared radiation models may be adjusted/refined (e.g., based on input from a user of the system 400 and/or other users) as the infrared radiation models are used for testing imaging system analytics to facilitate designing of improved molds and/or determination of more accurate thermal signatures to obtain desired thermal properties. For example, if feedback indicates that the mold 440 and the infrared radiation models are not producing accurate image classification results, the infrared radiation models may be adjusted and/or new infrared radiation models created for application on the mold 440 and/or other molds associated with the target.

Data associated with applying heat signatures to modes may be stored (e.g., in memories, databases, etc.). Such storage may be local to the devices and/or systems and/or remote from the devices and/or systems, such as a remote server(s)/database(s) accessible by the mold temperature controller 465 via a local area network and/or a cloud service. In FIG. 4, the system 400 includes a thermal model database 470 for storing infrared radiation models, parameters associated with thermal signatures, user feedback, and/or other data associated with various targets. In some cases, such models and/or other data may be adjusted based on feedback (e.g., user feedback) to facilitate improved thermal data obtainable from the molds.

The system 400 includes an environment simulation device 475. The environment simulation device 475 may be used to simulate an environment to provide the scene 430. In some cases, the environment simulation device 475 may be used to design and set up an environment (e.g., 2D environment, 3D environment) simulating real world settings. The environment simulation device 360 may include, by way of non-limiting examples, one or more lighting devices (e.g., to control ambient light), one or more heating/cooling elements (e.g., to control ambient temperature), and/or other components. Such components of the environment simulation device 475 may be collectively used to control/simulate ambient temperature, weather conditions (e.g., humidity using a humidity machine(s), rain using a sprinkler(s), fog using a fog machine(s), windiness using a fan(s)), and/or other properties of a desired environment. In an aspect, the environment to be simulated may be defined by a user. In some cases, ambient light and/or time of day (e.g., defined by the ambient temperature and the ambient light) may be simulated/emulated. It is noted that, while ambient light and time of day generally do not affect infrared imaging of the target (and thus may be ignored when defining the environment for infrared imaging purposes), the ambient light and time of day may be controlled for and affect certain applications, such as applications in which fusing of infrared images with, for example, visible-light images may be desired. In another aspect, the environment simulation device 475 may provide a list of environments having predefined properties that can be simulated and request the user select from the list of environments. In some cases, the environment simulation device 475 may be able to adjust one or more of the predefined properties in response to user input. In some cases, a motion factor may be applied to the mold 440 to simulate/emulate the target moving through the scene 430 (e.g., to simulate/emulate the target walking through a hallway). As an example, the FPA 415 and/or other camera may be used to capture infrared images indicative of infrared radiation in the scene 430 using different fields of views.

Data associated with simulating an environment may be stored (e.g., in memories, databases, etc.). Such storage may be local to the devices and/or systems and/or remote from the devices and/or systems, such as a remote server(s)/database(s) accessible by the environment simulation device 475 via a local area network and/or a cloud service. In FIG. 4, the system 400 includes an environment model database 480 for storing parameters/models associated with different environments to be simulated. In some cases, such parameters/models may be adjusted based on feedback (e.g., user feedback).

In some embodiments, the same user(s) may be able to access and operate the imaging system 405 and/or other imaging systems, the mold designing device 450, the mold manufacturing device 455, the mold temperature controller 465, and the environment simulation device 475. In such embodiments, the user(s) may be able to readily design and create molds as needed, apply heat signatures to the molds, simulate/emulate an environment, capture images of the molds using one or more imaging systems, and determine analytics for the imaging system(s) based on the captured images. Access to various of these systems, devices, and/or controllers (e.g., a combination of 405, 455, 465, 475) may also allow for readily testing of imaging system analytics using images of molds. In cases in which multiple imaging systems are tested, test performance variations between the analytics determined/gathered by the different imaging systems may be compared.

In some embodiments, different users may use different imaging systems, mold designing devices, mold manufacturing devices, mold temperature controllers, and/or environment simulation devices. These devices and/or controllers may be operated to generate the same or similar molds (e.g., molds of the same target created according to the same or similar modeling data), apply the same or similar thermal signatures to the molds, and/or simulate/emulate the same or similar environments such that analytics for and test performance variations between the different imaging systems operated by different users may be compared with each other.

Figure 5:
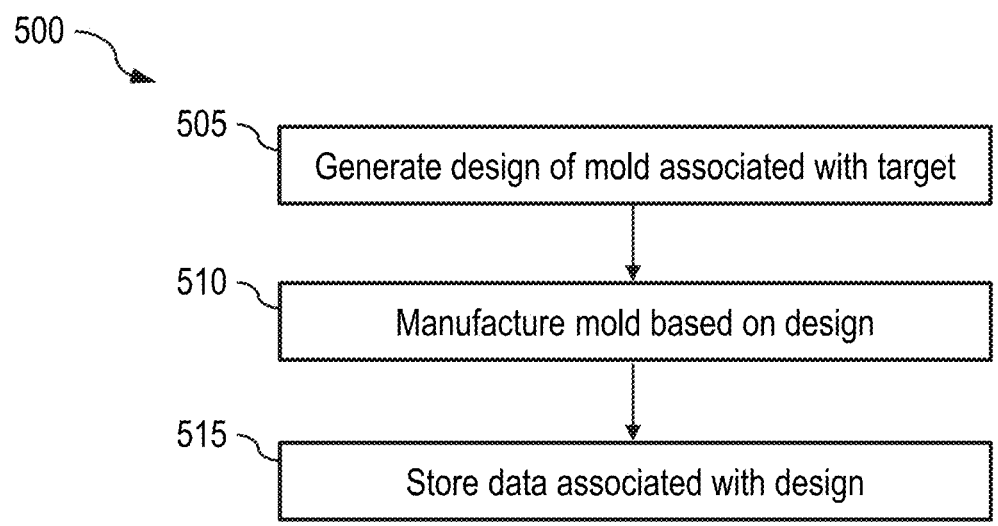
FIG. 5 illustrates a flow diagram of an example process for generating molds in accordance with one or more embodiments of the present disclosure.

FIG. 5 illustrates a flow diagram of an example process 500 for generating molds in accordance with one or more embodiments of the present disclosure. Although the process 500 is primarily described herein with reference to the system 400 of FIG. 4 for explanatory purposes, the process 500 can be performed alternatively or in addition at other systems in which image capture and/or imaging system testing using a mold is implemented. Note that one or more operations in FIG. 5 may be combined, omitted, and/or performed in a different order as desired.

At block 505, the mold designing device 450 may generate a design of a mold associated with a target. The design of the mold may be based on modeling data associated with the target. The design of the mold may identify a size, a shape, a material, a texture, and/or other characteristic of the mold. A mold of a target may have a size of a larger scale or a smaller scale than a size of an actual target or a size (e.g., an average size) of a target of a certain target type. As one example, a mold of a vehicle (e.g., a car) may have a size of a much smaller scale than a size of an actual vehicle. As another example, a mold of an electrical circuit may have a size of a much larger scale than a size of an actual electrical circuit. The modeling data may include 2D models/representations, 3D models/representations, and/or other data that provide a size, a shape, a chemical composition, contours, and/or other physical characteristics of the target. In some cases, the modeling data may be locally stored in the mold designing device 450 and/remotely stored (e.g., in the target model database 460).

In some cases, the mold designing device 450 may include equipment to generate modeling data (e.g., on-the-fly). The mold designing device 450 may include obtain one or more 2D images of a target and generate one or more 3D images based on the 2D image(s). The 3D image(s) may be used as modeling data to design the mold. The 2D image(s) may be retrieved from the target model database 460 and/or captured by a camera (e.g., visible-light camera or infrared camera) of the mold designing device 450 (if such a camera is available).

At block 510, the mold manufacturing device 455 may manufacture the mold associated with the target according to the design of the mold. By way of non-limiting examples, the mold manufacturing device 455 may include a printer device (e.g., 3D printer device), a CNC machining device, an injection molding device, an extrusion device, a polymer casting device, and/or any device appropriate to manufacture a desired mold. As one example, the mold manufacturing device 455 may include a 3D printer device to print a 3D image of a human face to obtain the mold 440. In some cases, a user may drill two holes in the mold from the mold manufacturing device 455 to obtain the mold 440. In other cases, the mold manufacturing device 455 may be able to directly manufacture the mold 440 with the holes therein (e.g., without a user manually drilling the holes). The holes may represent (e.g., simulate, emulate) human eyes or, more particularly, the inner canthus of the human eyes.

At block 515, the mold designing device 450, the target model database 460, and/or other storage may store data associated with designing the mold 440. For example, the data may include the 3D image and the design (e.g., indicating size, shape, and/or other physical characteristics) of the mold (e.g., with or without holes). In some cases, user feedback relating to the mold 440 may also be stored by the mold designing device 450, the target model database 460, and/or other storage.

Figure 6:
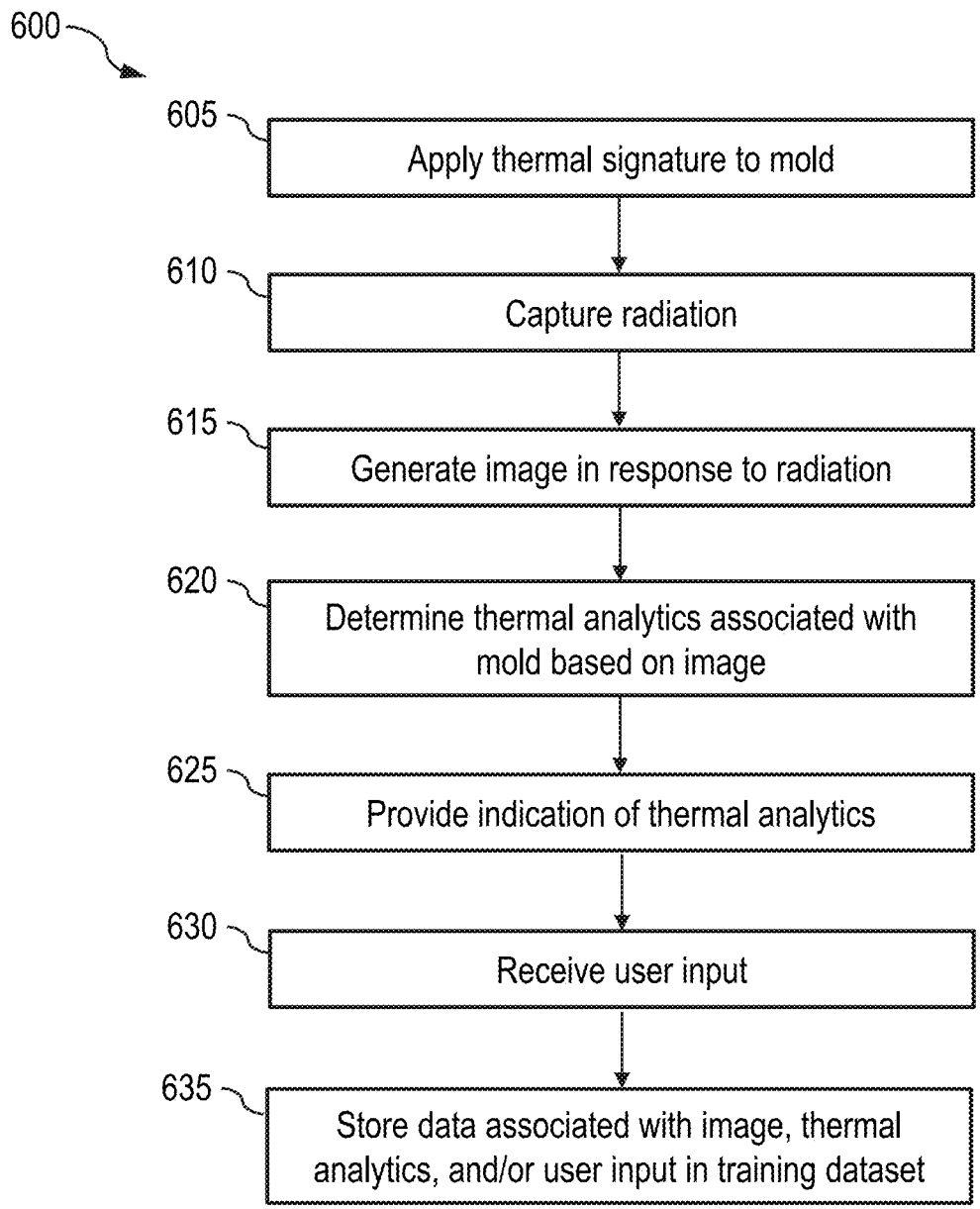
FIG. 6 illustrates a flow diagram of an example process for facilitating imaging system testing using molds in accordance with one or more embodiments of the present disclosure.

FIG. 6 illustrates a flow diagram of an example process 600 for facilitating imaging system testing using molds in accordance with one or more embodiments of the present disclosure. Although the process 600 is primarily described herein with reference to the system 400 of FIG. 4 for explanatory purposes, the process 600 can be performed alternatively or in addition at other systems in which image capture and/or imaging system testing is implemented. Note that one or more operations in FIG. 6 may be combined, omitted, and/or performed in a different order as desired.

For explanatory purposes, the process 600 is described in relation to imaging system testing using the mold 440. In an embodiment, the mold 440 may be created using the process 500 of FIG. 5. At block 605, the mold temperature controller 465 may apply a thermal signature to the mold 440. Applying of the thermal signature on the mold 440 may allow infrared radiation (e.g., heat) generated from a surface(s) of the mold 440 in the scene 430 to be propagated to simulate a real-life heat distribution/transfer associated with the target corresponding to the mold 440.

At block 610, the FPA 415 may capture radiation (e.g., infrared radiation). The radiation may include radiation from the scene 430, which includes radiation from the mold 440 in response to the applied thermal signature. At block 515, the FPA 415 may generate an image (e.g., infrared image) in response to the radiation. The image may include image data. In some cases, the FPA 415 and/or circuitry coupled to the FPA 415 may convert the radiation into electrical signals (e.g., voltages, currents, etc.) and generate the image data based on the electrical signals. The image data may include pixel values. The pixel values may be represented in terms of digital count values generated based on the electrical signals obtained from converting the captured radiation. For example, in a case that the FPA 415 includes or is otherwise coupled to an ADC circuit, the ADC circuit may generate digital count values based on the electrical signals. For an ADC circuit that can represent an electrical signal using 14 bits, the digital count value may range from 0 to 16,383. In some cases, the FPA 415 may represent the image data in an image according to a palette. A given pixel of the image may have a visual representation value (e.g., a color value or a grayscale value) indicative of a temperature of the pixel. For example, a temperature associated with a target (e.g., the mold 440) in the scene 430 may be represented in pixels of an infrared image (e.g., a thermal infrared image) formed of the image data that correspond to the target.

At block 620, the image analytics device 420 may determine thermal analytics associated with the mold 440 based on the image. The image analytics device 420 may detect the mold 440 in the image. In this regard, the image analytics device 420 may analyze the image and detect for one or more target types (e.g., a human or portion thereof such as a human face, a car, a plane, a circuit board) by performing target detection/recognition on the image. Such target detection/recognition may be based upon, for example, shapes, sizes, thermal characteristics, and/or other characteristics identified in the scene 430 by the image analytics device 420. In some cases, the image analytics device 420 may associate a condition with the mold 440 detected in the image. Associating a condition with a target may be referred to as determining (e.g., guessing) a condition of the target. In this regard, the image analytics device 420 may be appropriately trained to determine presence of a condition.

At block 625, the output/feedback device 425 may provide an indication of the thermal analytics. In some cases, the image analytics device 420 may provide the thermal analytics and/or the indication of the thermal analytics to the output/feedback device 425. In some cases, alternatively or in addition, the output/feedback device 425 may generate the indication based on the thermal analytics from the image analytics device 420. The indication may be a visual indication, an audio indication, a tactile indication, and/or other type of indication. As one example, the image analytics device 420 may annotate the image, and the output/feedback device 425 may include a display device to display the annotated image.

At block 630, the output/feedback device 425 may receive user input associated with the thermal analytics. For example, the output/feedback device 425 may display the indication to a user along with or followed by a user interface (e.g., touch screen, fields of an evaluation form) to request feedback from the user. The user feedback may include feedback regarding the thermal analytics themselves (e.g., an accuracy related to detected targets or conditions associated with such targets), infrared radiation models, target models, environment models, and/or any input from the user (e.g., to facilitate current or subsequent testing of imaging analytics). Such user feedback may be used to adjust operation of, models used by, and/or other aspects of the imaging system 405, the mold designing device 450, the mold manufacturing device 455, the mold temperature controller 465, and/or the environment simulation device 475. As an example, when the image analytics device 420 generates an annotated image, the user may edit and/or confirm existing annotations by the image analytics device 420 and/or add annotations. In some cases, the user does not provide input. In some cases, lack of input from the user may be considered user input, since lack of feedback may indicative that no adjustments to operation and/or models are needed.

At block 635, the image analytics device 420, the output/feedback device 425, and/or the analytics database 445 may store, in a training dataset (e.g., neural network training dataset) associated with the image generated at block 615, the thermal analytics determined by the image analytics device 420 at block 620, the indication provided by the output/feedback device 425 at block 625, any feedback received by the output/feedback device 425 at block 630, and/or other data associated with facilitating testing of imaging system analytics. In some embodiments, the training dataset may be used to train a neural network (e.g., a CNN). As an example, the data may include images with annotations by the image analytics device 420 and/or manual user annotations. In some cases, the neural network may be trained with large training datasets including thousands of images. In some cases, the neural network may be evaluated based on correctness of its target detection/recognition on new images from a dataset not part of the training dataset. Once the neural network is tested using these new images (e.g., including the image generated at block 615), the new images may be stored in the training dataset. In some embodiments, the image generated at block 615 may be used exclusively to test and verify one or more imaging systems (e.g., not train neural networks), whereas images (e.g., real-world images) of actual targets are used to train neural networks (e.g., CNNs).

Figure 7:
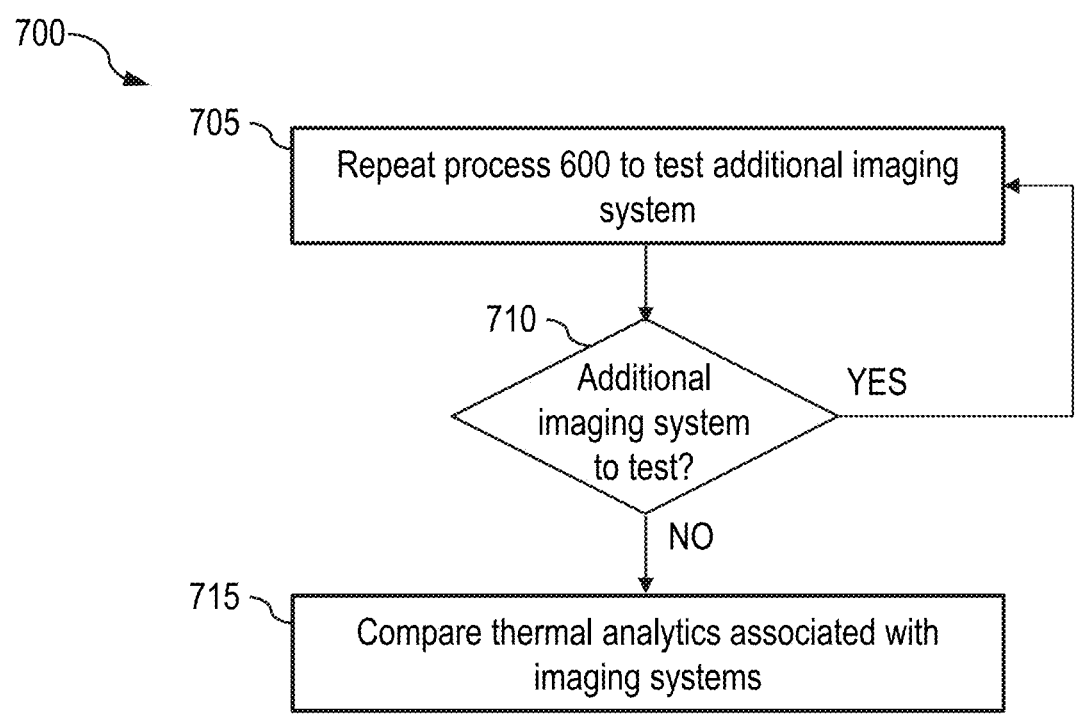
FIG. 7 illustrates a flow diagram of an example process for facilitating imaging system testing using molds in accordance with one or more embodiments of the present disclosure.

FIG. 7 illustrates a flow diagram of an example process 700 for facilitating imaging system testing using molds in accordance with one or more embodiments of the present disclosure. For explanatory purposes, the process 700 may be performed after the process 600 is performed using the imaging system 405.

At block 705, an imaging system performs the process 600 of FIG. 6. In some aspects, the imaging system may be operated by the same user(s) as the imaging system 405. In such aspects, the mold 440 and/or a mold based on the same mold model may be used and the setup (e.g., thermal signature, simulated environment) may be maintained. In other aspects, the imaging system may be operated by other user(s) situated in a different location. Devices and/or controllers of the imaging system may be operated to generate the same or similar mold (e.g., mold of the same target or target type created according to the same or similar modeling data), apply the same or similar thermal signatures to the mold, and/or simulate/emulate the same or similar environments.

At block 710, a determination is made as to whether there are additional imaging systems to test. If the determination is that there are additional imaging systems to test, the process 700 proceeds to block 705. A next imaging system may perform block 705. If the determination is that there are no more imaging systems to test, the process 700 proceeds to block 715. At block 715, analytics for and test performance variations between the imaging system 405 and other imaging systems may be compared with each other. Such comparisons may be performed by a user(s) of the various imaging systems and/or by a processor(s).

As one non-limiting example, the processes 500, 600, 700 of FIGS. 5, 6, and 7, respectively, may be used to facilitate imaging system testing of a mold when the mold is a human face. Turning first to the process 500, the process 500 may be performed to design and manufacture a mold 905 (shown in FIG. 9A). The mold designing device 450 may include a thermal camera and a processing circuit. In some cases, the thermal camera and the processing circuit may be implemented using the imaging system 405, such as when a user operates the mold designing device 450 and the imaging system 405. In some cases, the thermal camera and/or the processing circuit may be implemented using the imaging system 100. For example, the thermal camera may be implemented by the imaging capture component 120 of the imaging device 105, and the processing circuit may be implemented by the processing component 110 of the imaging device 105 and/or a processing circuit of the remote device 155. In other cases, the thermal camera and/or the processing circuit may be separate from the imaging system 100.

To implement block 605, the thermal camera may capture a 2D thermal image snapshot of a target (e.g., an actual person's face) and the processing circuit may generate a 3D image based on the 2D thermal image snapshot. The model associated with the target may be, or may be based on, the 3D image. Based on the 3D image, the processing circuit may determine a size (e.g., relative dimensions), a shape, a texture, and/or other characteristics associated with the mold 905. In some cases, actual dimensions of the mold 905 may be scaled to be smaller than the actual target or larger than the actual target (e.g., as convenient to test desired analytics). In some cases, the processing circuit may receive the 2D thermal image snapshot from the thermal camera. In other cases, the thermal camera may store the 2D thermal image snapshot in a database (e.g., the target model database 460) and the processing circuit may retrieve the 2D thermal image snapshot from the database. As an example, FIG. 8 illustrates a 2D thermal image snapshot of a person's face with a face mask on. In FIG. 8, the 2D thermal image snapshot includes infrared image data represented using a white hot grayscale color palette. For example, the processing circuit may run a 3D design software that loads the 2D thermal image snapshot as input and provides a 3D image as output. In some cases, the processing circuit may map a luminosity of each pixel of the 2D thermal image snapshot to a height/depth of a corresponding pixel of the 3D image.

In this regard, the 2D thermal image snapshot may provide a height map. For example, dark 2D pixels may be mapped to tall/deep 3D pixels, and bright 2D pixels may be mapped to short/shallow 3D pixels.

To implement block 510, the mold manufacturing device 455 may include a printer device (e.g., 3D printer device). The printer device may print, using a print material, a 3D mold of the target (e.g., the actual person's face) based on the 3D image. The print material used for the mold may be based on a maximum temperature that may be applied to the mold (e.g., according to a thermal signature to be applied). As non-limiting examples, the print material may include acrylonitrile butadiene styrene (ABS), polylactic acid (PLA), or others. Holes may be drilled into the 3D mold from the printer device at a location corresponding to the inner canthus of human eyes, thus resulting in the mold 905. In some cases, the mold manufacturing device 455 may include a drilling device to drill the holes into the 3D mold from the printer device (e.g., as part of a mass and/or streamlined manufacturing process) to provide the mold 905. In other cases, a user of the printer device (e.g., a manufacturer of the mold 905) may manually drill the holes into the 3D mold from the printer device to obtain the mold 905. It is noted that in some cases the user of the mold designing device 450 and/or the mold manufacturing device 455 may be the user of the imaging system 405.

With the mold 905 manufactured, the process 600 may be performed to test analytics of a thermal camera 910 using the mold 905. In an embodiment, the thermal camera 910 may be, may include, or may be a part of, the imaging system 405 of FIG. 4. To implement block 605, the mold temperature controller 465 may apply a thermal signature to the mold 905. In some cases, a thermal signature may be applied to the mold 905 to simulate a desired health condition (e.g., to simulate a healthy person or a febrile person). In some cases, in addition to applying the thermal signal to the mold 905, the environment simulation device 475 may be used to simulate a desired environment. For example, the simulated environment may be a well-lit (e.g., effectuated using a lighting device(s) of the environment simulation device 475) and air-conditioned room (e.g., effectuated using a cooling/heating device(s) of the environment simulation device 475) equipped with one or more imaging devices to screen passersby for elevated body temperature. Similar to the size of the mold 905 being scalable (e.g., the same as, smaller than, or larger than the actual person's face) relative to the actual person's face, a setup (e.g., equipment used and appropriately disposed) to simulate the desired environment may be scalable relative to an actual/typical size of the environment. In an embodiment, the mold 905 may be the mold 440 and the simulated environment (which includes the mold 805 therein) may be the scene 430.

As an example, FIGS. 9A, 9B, and 9C illustrate views associated with a setup to facilitate testing of analytics of the imaging system 405 using the mold 905 in accordance with one or more embodiments of the present disclosure. Not all of the depicted components may be required, however, and one or more embodiments may include additional components not shown in the figures. The mold temperature controller 465 may heating elements 915 and 920 and a fan 925. A thermal signature may be defined by parameters, such as a location of the heating elements 915 and 920 relative to the mold 905, a temperature applied by each of the heating elements 915 and 920, a location of the fan 925 relative to the mold 905, and/or an air power of the fan 925 to blow on the mold 905.

The mold 905 may be disposed on (e.g., glued onto) the heating element 915 having a controllable temperature. In this regard, the heating element 915 may provide structural support for the mold 905 and apply heat to the mold 905. When the heating element 915 applies controlled heat to the mold 905, a distance from a contoured surface of the mold 905 to the heating element 915 determines a surface temperature of the mold 905. As shown in FIG. 9A, the heating element 915 produces a higher temperature on portions of the contour surface of the mold 905 at a shorter distance/depth from the heating element 915 and produces a lower temperature on portions of the contour surface of the mold 905 at a longer distance/depth from the heating element 915. The heating element 920 (e.g., a heater resistor) may provide more localized heating compared to the heating element 915. In some cases, a location and/or a temperature of the heating element 920 may be selectively adjusted to simulate a healthy person or a febrile person, as further discussed herein. The fan 925 may be positioned in front of the mold 905 and operated to blow air on the mold 905. In this regard, the mold 905 may be heated by the heating element 915 from behind and cooled by the fan 925 from the front. The blown air may increase a temperature contrast on the contoured surface of the mold 905 (e.g., by cooling the contoured surface) detected by the thermal camera 910. Heating by the heating element 915 and/or 920 and/or blown wind by the fan 925 may be adjusted as appropriate to effectuate a desired temperature and/or desired temperature contrast.

As shown in FIG. 9C, a rotating disc 930 may optionally be positioned between the thermal camera 910 and the mold 905. The rotating disc 930 has a portion with a semicircular cross section and a portion with a ring-shaped cross section. The rotating disc 930 may be rotatable to selectively expose the mold 905 to the thermal camera 910 or block the mold 905 from the thermal camera. Exposing the mold 905 may simulate the person's face entering or remaining within a field of view of the thermal camera 910. Blocking the mold 905 may simulate the person's face exiting or otherwise remaining outside the field of view of the thermal camera 910. To expose the mold 905 to the thermal camera 910, the rotating disc 930 may be rotated such that the portion with the ring-shaped cross section faces the thermal camera. It is noted that the portion with the ring-shaped cross section and/or the thermal camera 910 is appropriately positioned such that the rotating disc 930 is outside the field of view of the thermal camera (e.g., the rotating disc 930 is not in images captured by the thermal camera 910). To block the mold 905 from the thermal camera 910, the rotating disc 930 may be rotated such that the portion with the semicircular cross section faces the thermal camera 910 and covers the field of view of the thermal camera 910. In cases where entering and/or exiting the field of view of the thermal camera 910 by the person does not need to be simulated, the rotating disc 930 may be removed from the setup.

As another example of simulating a moving person, the thermal camera 910 and/or the heating element 915 may be movable. As one example, the heating element 915 may be mounted on or part of a movable vehicle/mount to allow movement of the heating element 915 (with the mold 905 disposed thereon) relative to the thermal camera 910, which may remain stationary while the heating element 915 is moved.

To implement blocks 610 and 615, the thermal camera 910 (e.g., used to implement the FPA 415) may be aimed at the mold 905 (while the thermal signature is applied to the mold 905). The thermal camera 910 may capture radiation and generate an image in response to the radiation. To implement block 620, the thermal camera 910 (e.g., used to implement the image analytics device 420) may determine analytics of the imaging system 405 based on the image. The thermal camera 910 may be used to detect the mold 905 in the image based on a size, a shape, a temperature distribution, and/or other characteristics associated with the mold 905 and/or the target (e.g., a person). In this regard, the thermal camera 910 may detect temperatures (e.g., a temperature distribution) on the surface of the mold 905 facing the thermal camera 910 and detect for targets in a scene.

To implement blocks 625 and 630, the thermal camera 910 (e.g., used to implement the output/feedback device 425) may provide an indication of the thermal analytics to a user and receive user feedback. To implement block 635, the mold designing device 450, the mold temperature controller 465, the environment simulation device 475, and/or the thermal camera 910 may store data associated with models associated with generating the mold 905, infrared radiation models associated with defining the thermal signatures, models associated with simulating environments, the image captured by the thermal camera 910, the analytics generated by the thermal camera 910, and/or feedback (if any) from one or more users to one or more appropriate databases. In some cases, the image analytics device 420 may associate the analytics only to the actual person whose face is used to generate the mold 905. In other cases, the image analytics device 420 may associate the analytics more generally to the target type (e.g., the human face) associated with the mold 905, rather than only to the actual person whose face is used to generate the mold 905.

In some cases, blocks 605, 610, 615, 620, and 625 may be better described as being implemented substantially in tandem with each other. With the thermal camera 910 pointing at the mold 905, a temperature of the heating element 915 may be increased until the thermal camera 910 detects a stable 37° C. (e.g., temperature generally associated with a healthy person) at a location of the holes (e.g., simulating the inner canthus) of the mold 905. With the location of the holes of the mold 905 at 37° C., the thermal camera 910 may detect the simulated face and the simulated inner canthus. The thermal camera 910 may identify the mold 905 as being a person's face based on a size, a shape, facial features (e.g., inner canthus, nose, face mask), thermal properties, and/or other properties of the mold 905. A temperature probe 935 (e.g., thermocouple probe) may optionally be positioned at a location of the mold 905 to detect a temperature of the mold 905 at that location. Temperature readings from the temperature probe 935 may be compared against temperatures detected by the thermal camera 910. For example, the temperature probe 935 may be positioned at the holes and may be used as a validation of analytics determined using the thermal camera 910. A distance from a contoured surface of the mold 905 to the heating element 915 determines a surface temperature of the mold 905 and, as such, the temperature detected by the analytics of the thermal camera 910. To have the mold 905 simulate a potentially febrile person, the heating element 920 may be disposed close to the holes of the mold 905 on the surface of the mold 905 facing the thermal camera 910. In this regard, the heating element 920 may provide more localized heating compared to the heating element 915. In some cases, an elevated temperature event may refer to a detection of a potentially febrile person. To have the mold 905 simulate a non-febrile person (e.g., sufficient to categorize the person as being sufficiently healthy for some applications), the heating element 920 may be removed or disposed away from the holes of the mold 905.

In some cases, the thermal camera 910 may determine whether an elevated temperature event is present if a detected temperature is within or outside a threshold (e.g., greater than 1 degree C., 2 degrees C., or other threshold) of 37° C. If a detected temperature at a location of the inner canthus is outside the threshold, the thermal camera 910 determines that the mold 905 exhibits an elevated body temperature. If a detected temperature at a location of the inner canthus is within the threshold, the thermal camera 910 determines that the mold 905 exhibits an elevated body temperature.

Figure 10A:
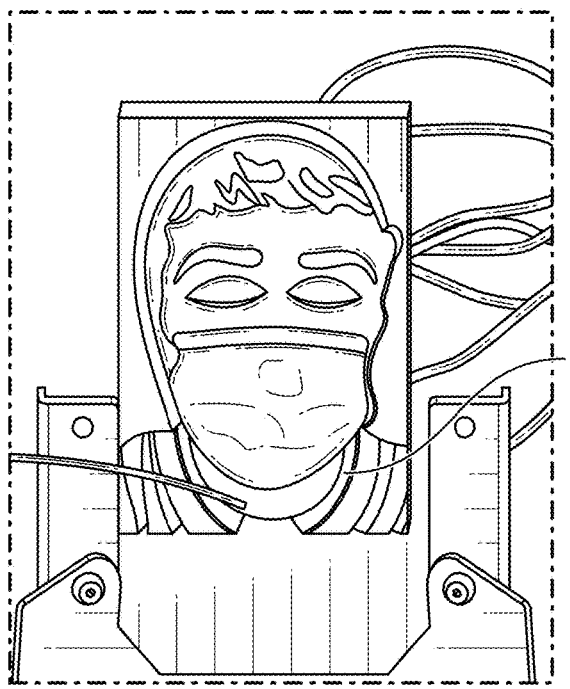
FIG. 10A illustrates a simulation of a non-febrile person in accordance with one or more embodiments of the present disclosure.
Figure 10B:
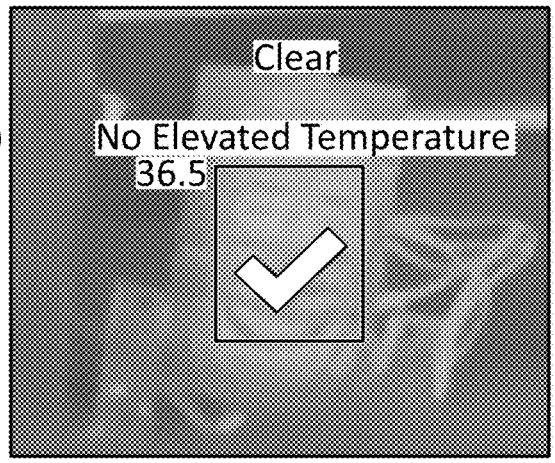
FIG. 10B illustrates analytics associated with the simulation of FIG. 10A in accordance with one or more embodiments of the present disclosure.

As an example, FIG. 10A illustrates a simulation of a non-febrile person and FIG. 10B illustrates analytics associated with the simulation of FIG. 10A. In FIG. 10A, when the heating element 915 is not close to the holes (e.g., simulating the canthus area) of the mold 905, the thermal camera 910 does not detect elevated temperature. In this regard, the analytics indicate that the thermal camera 910 detected a person's face and did not detect an elevated temperature event. In FIG. 10B, the thermal camera 910 provides the analytics (e.g., displayed on a display device to a user) using an annotated image. The annotated image includes a visual indication including a bounding box around a location of the mold 905 that simulates the person's face to indicate a location of a detected target. The annotated image also includes visual indications to indicate no elevated temperature event having been detected by the thermal camera 910. These visual indications include a check mark, the word "Clear," the phrase "No elevated temperature," and the temperature value 36.5 indicative of a temperature (in Celsius) at the holes of the mold 905. In some cases, the annotated image may be colored to allow quick notification (e.g., to the user) of the analytics. For example, a green color filter/mask may be applied to the annotated image, since green is generally associated with positive events.

Figure 11A:
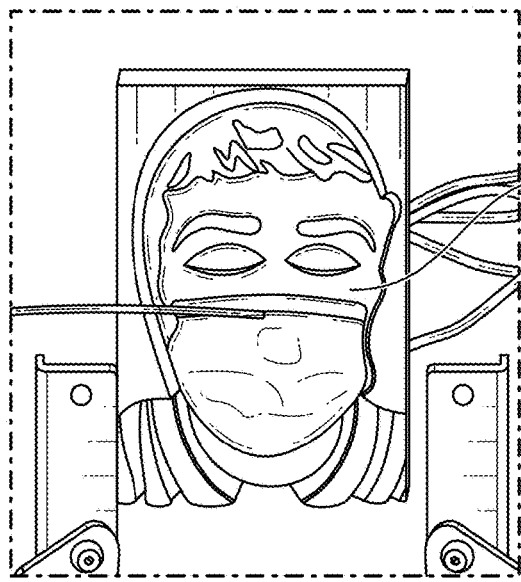
FIG. 11A illustrates a simulation of a febrile person in accordance with one or more embodiments of the present disclosure.
Figure 11B:
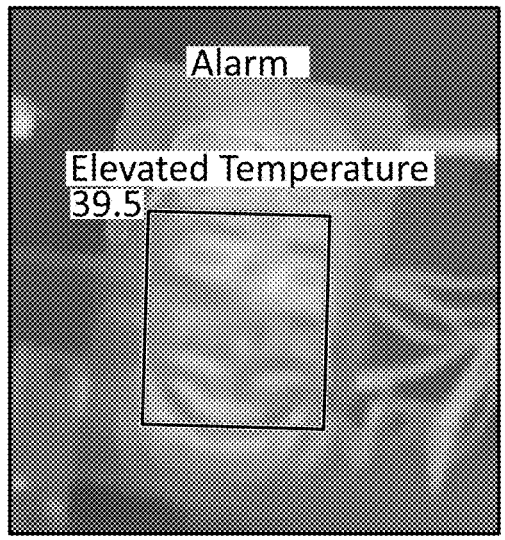
FIG. 11B illustrates analytics associated with the simulation of FIG. 11A in accordance with one or more embodiments of the present disclosure.

As an example, FIG. 11A illustrates a simulation of a febrile person and FIG. 11B illustrates analytics associated with the simulation of FIG. 11A. In FIG. 11A, when the heating element 920 is close to the holes of the mold 905, the thermal camera 910 detects elevated temperature. In this regard, the analytics indicate that the thermal camera 910 detected a person's face and detected an elevated temperature event. In FIG. 11B, the thermal camera 910 provides the analytics using an annotated image. The annotated image includes a visual indication including a bounding box around a location of the mold 905 that simulates the person's face to indicate a location of a detected target. The annotated image also includes visual indications to indicate an elevated temperature event having been detected by the thermal camera 910. These visual indications include the word "Alarm," the phrase "Elevated Temperature," and the temperature value 39.5 indicative of a temperature (in Celsius) at the holes of the mold 905. In some cases, the annotated image may be colored to allow quick notification (e.g., to the user) of the analytics. For example, a red color filter/mask may be applied to the annotated image, since red is generally associated with warnings.

To implement the process 700, one or more additional imaging systems may be used to capture images of the mold 905 and/or one or more molds manufactured according to the same design as the mold 905. In some aspects, the user(s) of the thermal camera 910 may be the user(s) of the additional imaging system(s). In such aspects, the user(s) generally have access and/or may replicate the setup (e.g., thermal signature, simulated environment) used to capture images of the mold 905 for use with the additional imaging system(s) to capture images of the mold 905 and/or other molds.

As such, the mold 905 allows for simulation of a thermal heat map for testing imaging system analytics, just as if tests were done using a real face. In some cases, the mold 905 and/or one or more molds manufactured according to the design associated with the mold 905 may be used for testing imaging system analytics. Images of the mold 905 or molds manufactured according to the same design as the mold 905 may be captured using different imaging systems, thus allowing performance of these imaging systems to be tested and compared with one another without needing one or more human subjects. Furthermore, using the mold 905 and/or the molds manufactured according to the same design as the mold 905 allows the target to remain substantially constant during the tests (e.g., as opposed to a case in which different imaging systems are used to take images of different people due to inconveniences of imaging the same person). Although the foregoing describes an image capturing the mold 905 (e.g., a single mode), in some cases an image may capture multiple molds. For example, a simulated environment may include multiple targets corresponding to different molds, such as molds of one or more people, one or more animals, one or more vehicles (e.g., cars, airplanes), and/or one or more other objects (e.g., trees, buildings, etc.). One or more of the molds in a single image may be used to test and compare analytics and performance of multiple imaging systems.

In some embodiments, a test setup may be made from several molds and used for comparing analytics/performance of one or more imaging systems. As one example, a molds setup may involve a camera installed on a pan-tilt (PT) motor. Such a setup may be used to test an entire camera performance and stability in long runs. The PT may move between presets to allow the camera to see/capture the different molds. Goals of such a setup may be to test that the camera operates normally without reboots, software memory leak, and/or other characteristics.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
   a mold temperature controller configured to apply a thermal signature to a mold of a target, wherein the mold temperature controller comprises:
   a heating element configured to apply heat to the mold; and
   a fan configured to blow air on the mold, wherein the thermal signature is based on the applied heat and the blown air;
   a focal plane array (FPA) configured to capture an infrared image of the mold; and
   an image analytics device configured to determine thermal analytics associated with the mold based on the infrared image.

2. The system of claim 1, further comprising an output/feedback device configured to:
   provide an indication of the thermal analytics; and
   receive user input associated with the infrared image, the mold, the thermal analytics, and/or the indication, wherein the indication comprises an image with annotations associated with the thermal analytics.

3. The system of claim 1, wherein the image analytics device is configured to determine the thermal analytics by:
   detecting the mold in the infrared image;
   detecting a temperature associated with at least a portion of the mold; and
   determining a condition of the mold based on the temperature.

4. The system of claim 1, further comprising a memory configured to store the infrared image and/or the thermal analytics in a training dataset, wherein the training dataset comprises a neural network training dataset.

5. The system of claim 1, wherein the mold is associated with a design, the system further comprising:
   a second FPA configured to capture a second infrared image of the mold or a second mold associated with the design; and
   a second image analytics device configured to determine thermal analytics based on the second infrared image.

6. The system of claim 1, further comprising a mold manufacturing device configured to manufacture the mold based on model data associated with the target.

7. The system of claim 6, wherein the mold manufacturing device comprises a printer device configured to print the mold.

8. The system of claim 6, wherein the model data comprises a three-dimensional image of the target, wherein the system further comprises a mold designing device configured to generate the three-dimensional image based on a two-dimensional image of the target, wherein the FPA is further configured to capture the two-dimensional image of the target.

9. The system of claim 1, wherein the mold temperature controller comprises a logic device configured to generate one or more control signals based on an infrared radiation model associated with the target, wherein the heating element is configured to apply the heat according to the one or more control signals, and wherein the fan is configured to blow the air according to the one or more control signals.

10. The system of claim 1, wherein the heating element is configured to apply the heat to a back surface of the mold, and wherein the fan is configured to blow the air on a front surface of the mold.

11. A method comprising:
applying a thermal signature to a mold of a target, wherein the applying comprises:
applying heat to the mold; and
blowing air on the mold, wherein the thermal signature is based on the applied heat and the blown air;
capturing an infrared image of the mold; and
determining thermal analytics associated with the mold based on the infrared image.

12. The method of claim 11, further comprising:
providing an indication of the thermal analytics; and
receiving user input associated with the infrared image, the mold, the thermal analytics, and/or the indication.

13. The method of claim 12, further comprising storing the infrared image, the thermal analytics, and/or the indication in a neural network training dataset.

14. The method of claim 11, wherein the determining comprises:
detecting the mold in the infrared image;
detecting a temperature associated with at least a portion of the mold; and
determining a condition of the mold based on the temperature.

15. The method of claim 14, wherein the target is a human face such that the mold represents the human face, and wherein the portion of the mold is associated with an inner canthus of the human face.

16. The method of claim 11, wherein the mold is associated with a design, wherein the infrared image is captured by a focal plane array (FPA) of a first thermal camera, wherein the thermal analytics is determined by a first image analytics device of the first thermal camera, the method further comprising:
capturing, by a second thermal camera, a second infrared image of the mold or a second mold associated with the design; and
determining, by the second thermal camera, thermal analytics based on the second infrared image.

17. The method of claim 11, further comprising manufacturing the mold based on model data associated with the target.

18. The method of claim 17, further comprising:
capturing a two-dimensional image of the target; and
generating a three-dimensional image of the target based on the two-dimensional image, wherein the model data comprises the three-dimensional image.

19. The method of claim 11,
wherein the heat is applied to a back surface of the mold, and wherein the air is blown on a front surface of the mold.

20. The method of claim 11, further comprising generating one or more control signals based on an infrared radiation model associated with the target, wherein the applying the heat comprises applying the heat according to the one or more control signals, and wherein the blowing the air comprises blowing the air according to the one or more control signals.

* * * * *